July 23, 1968    J. DE LIGT    3,394,041

GELLING ADHESIVE IN A CORRUGATED PAPER MAKING MACHINE

Filed July 13, 1966

INVENTOR.
JOHN DE LIGT
BY Thomas W. Lynn
ATTORNEY

United States Patent Office 3,394,041
Patented July 23, 1968

3,394,041
GELLING ADHESIVE IN A CORRUGATED PAPER MAKING MACHINE
John De Ligt, Covington, Va., assignor to West Virginia Pulp and Paper Company, New York, N.Y., a corporation of Delaware
Filed July 13, 1966, Ser. No. 564,828
3 Claims. (Cl. 156—548)

ABSTRACT OF THE DISCLOSURE

A rotatable cylinder has a series of radially and axially extending vanes uniformly spaced about its outer surface to form a series of open-sided chambers for receiving the correspondingly spaced flute tips of single-faced corrugated board. Apertures are formed through the cylinder between adjacent vanes so that steam supplied to the interior of the cylinder will pass through the apertures into each of the chambers and bathe the flute tip positioned in the chamber; thereby gelling an adhesive carried by the flute tip.

---

The present invention is directed to apparatus for manufacturing corrugated board and more particularly, to apparatus for gelling a raw starch suspension applied to the exposed flute tips of a single faced board.

In the manufacture of corrugated board, a web of corrugating medium is generally passed between a pair of intermeshing corrugating rollers to form a series of corrugations therein and the flute tips of the resulting corrugated web adhesively secured to a web of liner material. A second, or outside, liner is then applied to the exposed flute tips of this single faced board to provide what is generally known as double faced, corrugated board.

The material commonly used to join the outside liner to the single faced board is a suspension of raw starch granules in a carrier of cooked starch and water with various additives, such as caustic, borax and preservative added. This suspension has little or no adhesive properties when the raw starch is in an uncooked state, but upon the application of heat the raw starch granules swell, resulting in gelatinized mass with excellent bonding properties.

In the conventional corrugating process, gelatinization of the raw starch carried by the flute tips of the single faced board is generally accomplished by passing the single faced board with the outside liner applied thereto, over a series of steam heated chests known as hot plate. The hot plates section of the corrugating machine has long been recognized by the industry as having many disadvantages. In addition to being difficult to control and expensive to install and operate the floor space required for the hot plate section will generally be quite high since a typical hot plate section may be 40 ft. or more in length. Additionally, the use of a hot plate section will normally require the use of a draw section, on the same order of length as the hot plate section, in order to drag the corrugated board over the hot plates.

It has been discovered, however, that gelatinization of the raw starch need not be accomplished after the outside liner has been applied to the single faced board. Instead, heat, preferably in the form of steam, may be applied directly to the starch coated flute tips of the single faced board just prior to the application of the outside liner thereto. This, of course, eliminates the necessity for the long, inefficient and expensive hot plate section and the accompanying draw section.

One problem encountered in gelatinizing starch on the single faced board prior to the application of the outside liner, however, has been that of transferring sufficient heat to the starch in the short interval between starch application and application of the outside liner.

It is therefore, a principal object of the present invention to provide means for quickly and efficiently gelatinizing the raw starch carried by the flute tips of a single faced board prior to the application of an outside liner thereto. This is accomplished by utilizing a rotary nozzle carrying a series of open-sided chambers about its periphery. The flutes of the single faced board, each carrying a bead of the starch suspension on its tip, may then be received in these chambers and heat, preferably in the form of steam, injected into the chambers. Thus, as the single faced board travels from the starch applicator to the combiner, each of its flute tips is enclosed in its individual heated chamber and gelatinization of the raw starch is efficiently accomplished.

It will be apparent from the above that, in accordance with an additional object of the invention, the present invention provides means for gelatinizing the starch suspension which is compact and does not require excessive floor space.

It will also be seen that, through the use of the rotary nozzle of the present invention, means is provided for the intended purpose which is readily adjustable and permits short control response time.

These and other objects and advantages of the present invention will become more readily apparent from the following detailed description wherein.

Figure 1:
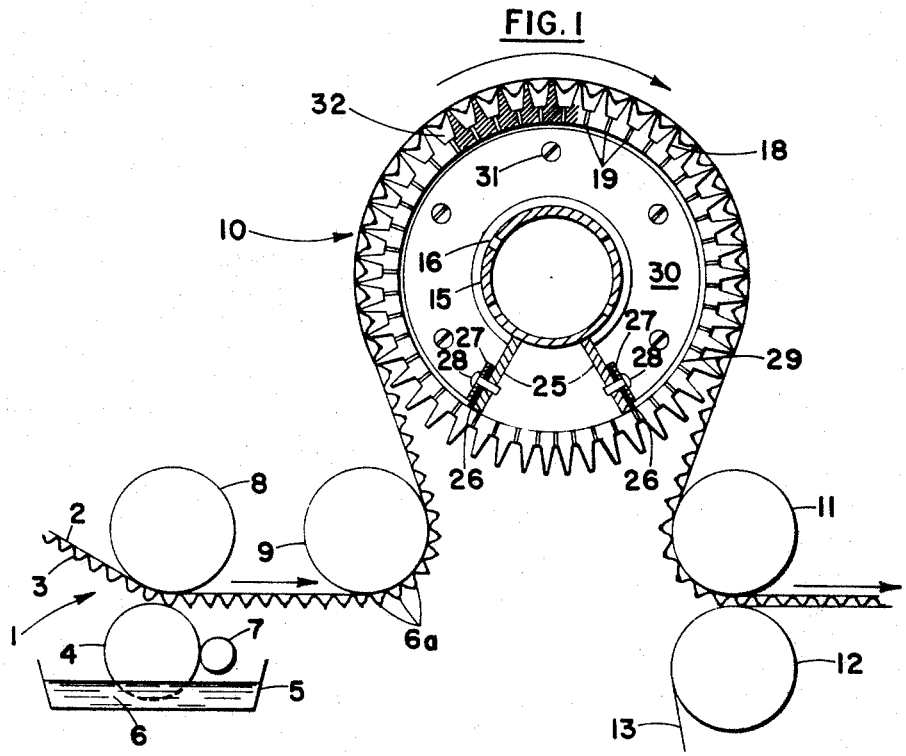
FIGURE 1 is a somewhat schematic cross-sectional view showing a corrugating operation modified in accordance with the present invention.

As seen in FIGURE 1, a single faced board 1 comprising a web of liner material 2 and a web of corrugating medium 3 is passed over an applicator roll 4 rotating in a tray 5 containing a suspension 6 consisting of raw starch in a carrier of cooked starch, water and various additives. A doctor roll 7 may be provided to meter the amount of starch carried to the flute tips of the single faced board and a rider roll 8 presses the exposed flute tips of the single faced board against the adhesive covered surface of the applicator roll 4. The coated, single faced board, carrying beads 6a of the suspension on its flute tips, is now carried past a turning roller 9, around the rotary nozzle 10 of the present invention and thence around a second turning roller 11 which forms a pressure nip with roller 12. A web 13 of outside liner material is applied to the flute tips of the single faced board in the pressure nip formed by rollers 11 and 12 and the resulting double faced board is passed downstream for further processing.

Figure 2:
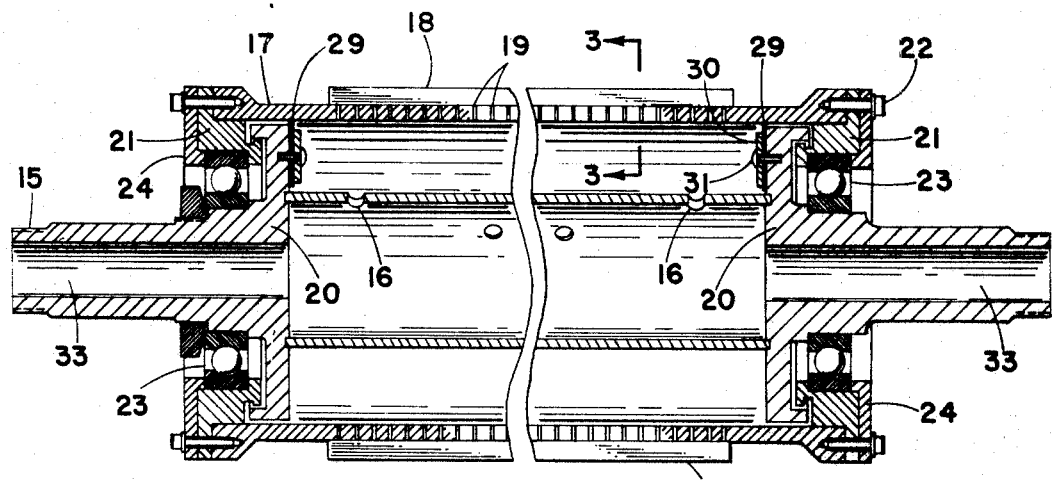
FIGURE 2 is a cross-sectional view of the rotary nozzle of the present invention.

With reference now to FIGURES 1 and 2 of the drawings, the rotary nozzle will be described in detail. As seen in FIGURES 1 and 2, the nozzle comprises a stationary, hollow shaft 15 having a series of apertures 16 formed in a medial portion thereof. Surrounding the medial portion of the stationary shaft 15 is a hollow cylindrical shell 17 having a series of vanes 18 extending axially and radially of the cylindrical shell.

Figure 3:
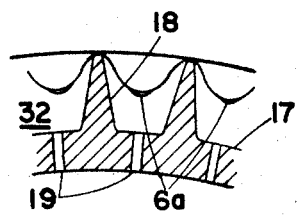
FIGURE 3 is a partial, cross-sectional view taken on line 3—3 of FIGURE 2.

As best seen in FIGURES 2 and 3, intermediate each pair of vanes 18 a series of passages 19 are bored through the cylindrical shell. Radially extending flanges 20 on the stationary shaft 15 cooperate with complementarily shaped members 21 bolted to the cylindrical shell 17 by means of bolts or the like 22 to form a labyrinth seal. Additionally, bearings 23, retained in place by coverplates 24, are provided to rotatably mount the cylindrical shell on the stationary shaft 15. Extending axially of the medial portion of the stationary shaft 15 and radially outwardly thereof, are a pair of plate members 25 bearing elongated sealing strips 26, of Teflon or the like, clamped in place by means of plates 27 and bolts, rivets or the like 28. A pair of arcuate sealing members 29, which may also be of Teflon or the like, are attached to flange 20 of the shaft 15 by means of clamp plates 30 and bolts or rivets 31, with the seals 29 extending around the shaft 15 from one plate 25 to the other.

In operation, it will be seen that as the single faced board is trained around the rotary nozzle 10, each of the flute tips will be received between a pair of vanes 18 to form a closed chamber 32. Since the vanes 18 of the nozzle positively engage the single faced board between the flutes thereof, the nozzle is rotated by the passage of the board and an external drive is not required. As the single faced board passes around the rotary nozzle with each starch covered flute tip received with a chamber 32, a heated gaseous medium, preferably in the form of steam, is delivered through the open ends 33 of the shaft 15 and thence, through the apertures 16 and passages 19 into each of the chambers 32. Thus, it will be seen that as the single faced board leaves the applicator roll 4 and is passed around the turning roll 9, each flute thereof is received and enclosed in its own individual chamber where it is continuously bathed by steam or the like; thereby, quickly and efficiently gelling the raw starch suspension carried by the flute tips preparatory to the application of an outside liner thereto.

Through the use of the elongated sealing strips 26 and the arcuate sealing members 29, the steam delivered to the interior of the nozzle is confined to that portion of the nozzle wrapped by the single faced board. It will be apparent, however, that if more or less wrap than is shown in FIGURE 1 is desired, the positions of the sealing strips 26 may be changed accordingly.

It will also be apparent that although the rotary nozzle is shown with a stationary shaft 15, the stationary shaft could be dispensed with and rotary steam joints or the like used at the ends of the cylindrical shell. Additionally, if desired, steam could be delivered through one end only of the nozzle and the opposite end used for the withdrawal of condensate.

Therefore, since these and other modifications of the present invention will readily occur to those skilled in the art, it is intended that the present invention be limited only within the scope of the appended claims.

I claim:

1. In a corrugating machine including means for applying a suspension of raw starch to the exposed flute tips of a single faced board and means for applying an outside liner to said starch coated flute tips, the improvement comprising, means located intermediate said starch applying and liner applying means for gelling said raw starch, said last named means comprising:
    (a) a rotatable cylindrical shell,
    (b) means extending radially outwardly of said shell about the periphery thereof and defining with portions of said periphery a series of open sided chambers positioned around said periphery of said shell, and
    (c) means for delivering a heated, gaseous medium to each of said chambers.
2. The apparatus of claim 1 wherein:
    (a) said radially outwardly extending means are spaced apart a distance substantially equal to the spacing between adjacent flute tips.
3. The apparatus of claim 2 wherein:
    (a) said means for delivering a heated, gaseous medium to each of said chambers includes a plurality of passages connecting the interior of said shell with said chambers.

References Cited

UNITED STATES PATENTS

| | | | |
|---|---|---|---|
| 1,998,046 | 4/1935 | Ellis | 162—372 X |
| 3,142,428 | 7/1964 | Faeber | 226—95 |
| 3,304,626 | 2/1967 | Leckner | 34—115 |

FOREIGN PATENTS 565,370  10/1944  Great Britain.

M. HENSON WOOD, JR., *Primary Examiner.*

H. NATTER, *Assistant Examiner.*